US012614840B2

(12) United States Patent
Cerretelli et al.

(10) Patent No.: US 12,614,840 B2
(45) Date of Patent: Apr. 28, 2026

(54) ANTENNA FOR MOTOR VEHICLES, AND MOTOR VEHICLE COMPRISING SUCH AN ANTENNA

(71) Applicant: ASK Industries S.p.A., Monte San Vito (IT)

(72) Inventors: Matteo Cerretelli, Sesto Fiorentino (IT); Andrea Notari, Scandiano (IT); Fabio Casoli, Reggio Emilia (IT)

(73) Assignee: ASK Industries S.p.A., Monte San Vito (IT)

( * ) Notice: Subject to any disclaimer, the term of this patent is extended or adjusted under 35 U.S.C. 154(b) by 50 days.

(21) Appl. No.: 18/678,961

(22) Filed: May 30, 2024

(65) Prior Publication Data

US 2024/0405411 A1 Dec. 5, 2024

(30) Foreign Application Priority Data

May 31, 2023 (IT) ........................ 102023000011067

(51) Int. Cl.
*H01Q 1/32* (2006.01)
*H01Q 1/28* (2006.01)
*H01Q 9/16* (2006.01)

(52) U.S. Cl.
CPC ........... *H01Q 1/3275* (2013.01); *H01Q 1/282* (2013.01); *H01Q 9/16* (2013.01)

(58) Field of Classification Search
CPC ...... H01Q 1/3275; H01Q 1/282; H01Q 1/521; H01Q 1/38; H01Q 1/32; H01Q 1/36; H01Q 9/16
See application file for complete search history.

(56) References Cited

U.S. PATENT DOCUMENTS

2016/0064807 A1* 3/2016 Reed ...................... H01Q 21/28 343/749
2016/0315378 A1* 10/2016 Kiriyama ............... H01Q 1/362
(Continued)

FOREIGN PATENT DOCUMENTS

CN 106898856 A * 6/2017 ........... H01Q 1/3258
CN 206558674 U * 10/2017 ............ H01Q 5/371
(Continued)

OTHER PUBLICATIONS

Search Report dated Dec. 22, 2023 in corresponding Italian application No. 202300011067.

*Primary Examiner* — Seokjin Kim
(74) *Attorney, Agent, or Firm* — B. Aaron Schulman, Esq.; Stites & Harbison, PLLC

(57) ABSTRACT

Antenna for a motor vehicle, comprising a mounting plate suitable to be connected to a mounting surface of the motor vehicle, a first printed circuit board adapted to be connected, in a substantially horizontal position, to the mounting plate, first and second radiating elements for transceiving respective first and second signals with the environment outside the antenna.

Both radiating elements comprise a respective printed circuit board along which there are arranged respectively a first electrically conducting track and a second electrically conductive track which extend along the respective printed circuit board along a substantially helical or serpentine path. The first radiating element has a maximum height, measured from the top surface of the first printed circuit board along the substantially vertical direction, and the first height of the first electrically conducting track is less than or equal to one-half of the maximum height of the first radiating element.

7 Claims, 4 Drawing Sheets

(56) References Cited

U.S. PATENT DOCUMENTS

| | | | | |
|---|---|---|---|---|
| 2020/0028249 | A1* | 1/2020 | Terashita | H01Q 1/521 |
| 2020/0194882 | A1* | 6/2020 | Kim | H01Q 25/00 |
| 2021/0098866 | A1* | 4/2021 | Kim | H01Q 9/32 |
| 2021/0359398 | A1* | 11/2021 | Notari | H01Q 1/521 |
| 2023/0268641 | A1* | 8/2023 | Liao | H01Q 5/371<br>343/713 |
| 2024/0097317 | A1* | 3/2024 | Terashita | H01Q 1/3275 |
| 2024/0291139 | A1* | 8/2024 | Huang | H01Q 23/00 |

FOREIGN PATENT DOCUMENTS

| | | | | | |
|---|---|---|---|---|---|
| DE | 202020100452 | U1 | * | 3/2020 | H01Q 9/36 |
| EP | 3 625 847 | | | 3/2020 | |
| EP | 3625847 | B1 | * | 5/2021 | H01Q 1/1214 |
| FR | 3092440 | A3 | * | 8/2020 | H01Q 1/27 |
| KR | 101347936 | B1 | * | 1/2014 | H01Q 5/335 |
| KR | 20140136191 | A | * | 11/2014 | H01Q 1/38 |
| KR | 20150062087 | A | * | 6/2015 | H01Q 1/3275 |
| KR | 20160033720 | A | * | 3/2016 | H01Q 7/00 |
| KR | 2017 0003986 | | | 11/2017 | |
| KR | 20170003986 | U | * | 11/2017 | H01Q 5/30 |
| KR | 101989481 | B1 | * | 6/2019 | H01Q 1/3275 |
| KR | 20220022542 | A | * | 2/2022 | H01Q 9/40 |
| KR | 102 370 885 | | | 3/2022 | |
| KR | 102370885 | B1 | * | 3/2022 | H01Q 9/40 |
| WO | WO-2016019784 | A1 | * | 2/2016 | H01Q 21/30 |
| WO | WO-2019048902 | A1 | * | 3/2019 | H01Q 1/42 |
| WO | WO-2019239230 | A1 | * | 12/2019 | H01Q 1/1214 |

* cited by examiner

ANTENNA FOR MOTOR VEHICLES, AND MOTOR VEHICLE COMPRISING SUCH AN ANTENNA

The present disclosure relates to an antenna for motor vehicles, and to a motor vehicle comprising such an antenna.

The antenna according to the disclosure is particularly suitable for being used with cars, for example mounted on the roof of a car, and will be described here by making reference to such application without intending anyhow to limit its possible application to other types of motor vehicles, such as for example buses, trucks, commercial vehicles, et cetera.

As known, antennas intended to be mounted on the roof or on another external surface of a motor vehicle basically comprise a functional part, consisting of a plurality of appropriately configured and assembled components that are adapted to accomplish the mounting and operation of the antenna, and a purely aesthetic part, typically a cover or canopy, configured for example in the shape of a shark fin, which is adapted to be coupled to the functional part, and whose purpose is to ensure the maintenance of adequate aesthetics of the motor vehicle once the antenna has been installed.

Usually, the functional part comprises a plurality of antennas or radiating elements that can transceive data and signals of different type with other vehicles, pedestrians, with fixed devices and communication structures, according to different standards and related fields of frequencies which have been introduced over the years, such as LTE (Long Term Evolution) DAB (Digital Audio Broadcasting), RF, GPS, FM, etc.

Although antennas currently on the market allow fulfilling the functions for which they are designed, there are some aspects worth of improvements.

In particular, the presence of several radiating elements placed unavoidably close to each other in the cramped space offered by the cover leads to problems related to the effective quality of the transceived signals due to the possible coupling between signals afferent to two or more radiating elements and interfering with each other.

Therefore, there is need and desire to provide an improved antenna for motor vehicles.

Accordingly, in one example there is provided an antenna for a motor vehicle, comprising:

a mounting plate suitable to be connected to a mounting surface of said motor vehicle;

at least a first printed circuit board adapted to be connected, in a substantially horizontal position, to said mounting plate;

at least one first radiating element for transceiving first signals with the environment outside said antenna, said first radiating element comprising a second printed circuit board which is connected at a first end portion thereof to said first printed circuit board and rises therefrom along a substantially vertical direction, along said second printed circuit board being arranged a first electrically conducting track which has an end portion connected to said first printed circuit board and extends on said second printed circuit board along a substantially helical or serpentine path, up to a first height measured from the top surface of said first printed circuit board along said substantially vertical direction;

at least a second radiating element for transceiving second signals with the environment outside the antenna, said second radiating element comprising a third printed circuit board which is connected at a first end portion thereof to said first printed circuit board and rises therefrom along said substantially vertical direction, along said third printed circuit board being arranged a second electrically conductive track which has an end portion connected to said first printed circuit board and extends on said third printed circuit board along a substantially helical or serpentine path, up to a second height measured from the top surface of said first printed circuit board along said substantially vertical direction;

and wherein said first radiating element has a maximum height measured from the top surface of said first printed circuit board along said substantially vertical direction, and said first height of said first electrically conducting track is less than or equal to one-half of said maximum height of said first radiating element.

According to some examples, the antenna according to the present disclosure may comprise one or more of the following features, which may be combined in any technical feasible combination:

the first height of the first electrically conducting track is less than the second height of the second electrically conducting track;

the mounting plate has a front edge and a rear edge, and wherein said first radiating element and said second radiating element are arranged in sequence substantially aligned with each other along a direction joining said front and rear edges;

the first radiating element further comprises a capacitive cap which is connected to said second printed circuit board at a second end portion of said second printed circuit board opposite said first end portion;

the capacitive cap comprises at least a center section, a first arm and a second arm which extend from opposite parts of the center section diverging from each other, and one or more coupling portions which extend from at least one of said center section and first and second arms and are configured to allow mechanical connection of the capacitive cap to the second printed circuit board;

the capacitive cap is made of a single piece of metallic material;

the one or more coupling portions comprise a first section protruding transversely from one end of said first arm toward said second printed circuit board, a second section that protrudes transversely from one end of the first section toward the center section, and one or more teeth that protrude transversely from one end of the second section and are each suitable for insertion into a corresponding slot defined on the second printed circuit board;

the second printed circuit board has, at its upper portion, a recess, and wherein said capacitive cap is coupled to the second printed circuit board by positioning, at least partially, the center section within the recess with the first and second arms extending from the center section along opposite sides of the second printed circuit board toward the first printed circuit board;

the one or more coupling portions comprise one or more teeth extending from the central section and are configured to be mechanically connected each to the second printed circuit board.

According to another example, there is also provided a motor vehicle comprising at least one antenna which comprises:

a mounting plate suitable to be connected to a mounting surface of said motor vehicle;

at least a first printed circuit board adapted to be connected, in a substantially horizontal position, to said mounting plate;

at least one first radiating element for transceiving first signals with the environment outside said antenna, said first radiating element comprising a second printed circuit board which is connected at a first end portion thereof to said first printed circuit board and rises therefrom along a substantially vertical direction, along said second printed circuit board being arranged a first electrically conducting track which has an end portion connected to said first printed circuit board and extends on said second printed circuit board along a substantially helical or serpentine path, up to a first height measured from the top surface of said first printed circuit board along said substantially vertical direction;

at least a second radiating element for transceiving second signals with the environment outside the antenna, said second radiating element comprising a third printed circuit board which is connected at a first end portion thereof to said first printed circuit board and rises therefrom along said substantially vertical direction, along said third printed circuit board being arranged a second electrically conductive track which has an end portion connected to said first printed circuit board and extends on said third printed circuit board along a substantially helical or serpentine path, up to a second height measured from the top surface of said first printed circuit board along said substantially vertical direction;

and wherein said first radiating element has a maximum height measured from the top surface of said first printed circuit board along said substantially vertical direction, and said first height of said first electrically conducting track is less than or equal to one-half of said maximum height of said first radiating element.

Particular embodiments of the disclosure form the subject matter of the dependent claims, the contents of which are intended to be considered an integral part of this description.

Further characteristics and advantages of the disclosure will become apparent from the detailed description that follows, which is provided purely by way of non-limiting example, with reference to the accompanying drawings, wherein.

Figure 1:
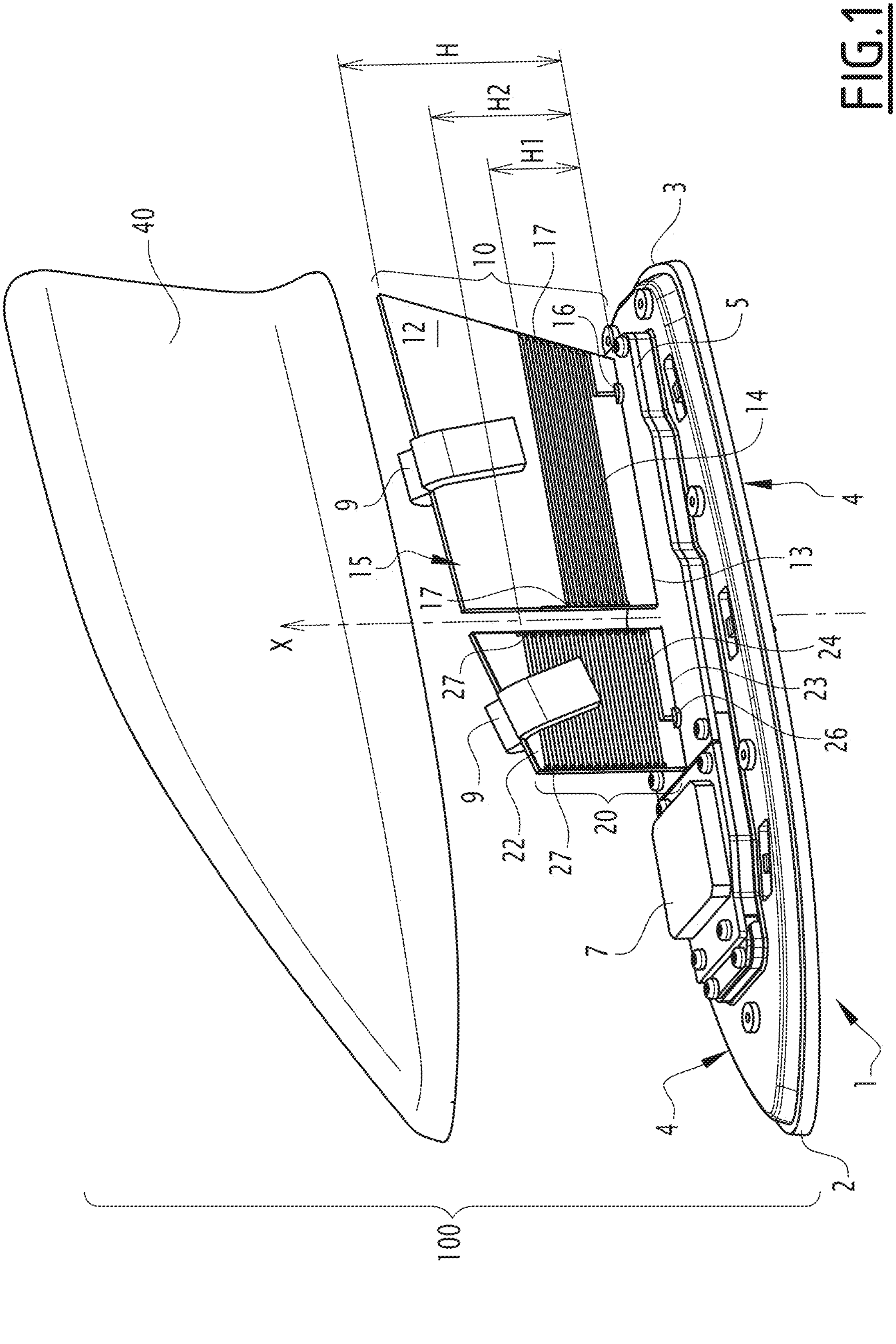
FIG. 1 is an exploded view illustrating a possible embodiment of an antenna according to the disclosure.

It should be noted that in the detailed description that follows, identical or similar components, either from a structural and/or functional point of view, may have the same or different reference numerals, regardless of whether they are shown in different embodiments of the present disclosure or in distinct parts.

It should also be noted that, in order to clearly and concisely describe the present disclosure, the drawings may not necessarily be to scale and certain features of the disclosure may be shown in somewhat schematic form.

Further, when the term "adapted" or "organized" or "configured" or "shaped", or a similar term is used in the present document while referring to any component as a whole, or to any part of a component, or to a combination of components, it has to be understood that it means and encompasses correspondingly either the structure, and/or configuration and/or form and/or positioning.

In addition, when the term "substantial" or "substantially" is used herein, it has to be understood as encompassing an actual variation of plus or minus 5% with respect to what indicated as a reference value, direction or position, and when the terms transversal or transversally are hereby used, they have to be understood as encompassing a direction non-parallel to the reference part(s) or direction(s)/axis they refer to, and perpendicularity has to be considered a specific case of transverse direction.

Finally, in the following description and claims, the numeral ordinals first, second, etc., will be used only for the sake of clarity of description and in no way they should be understood as limiting for whatsoever reason, nor that the order should be exactly the one described in the illustrated exemplary embodiments.

Figure 2:
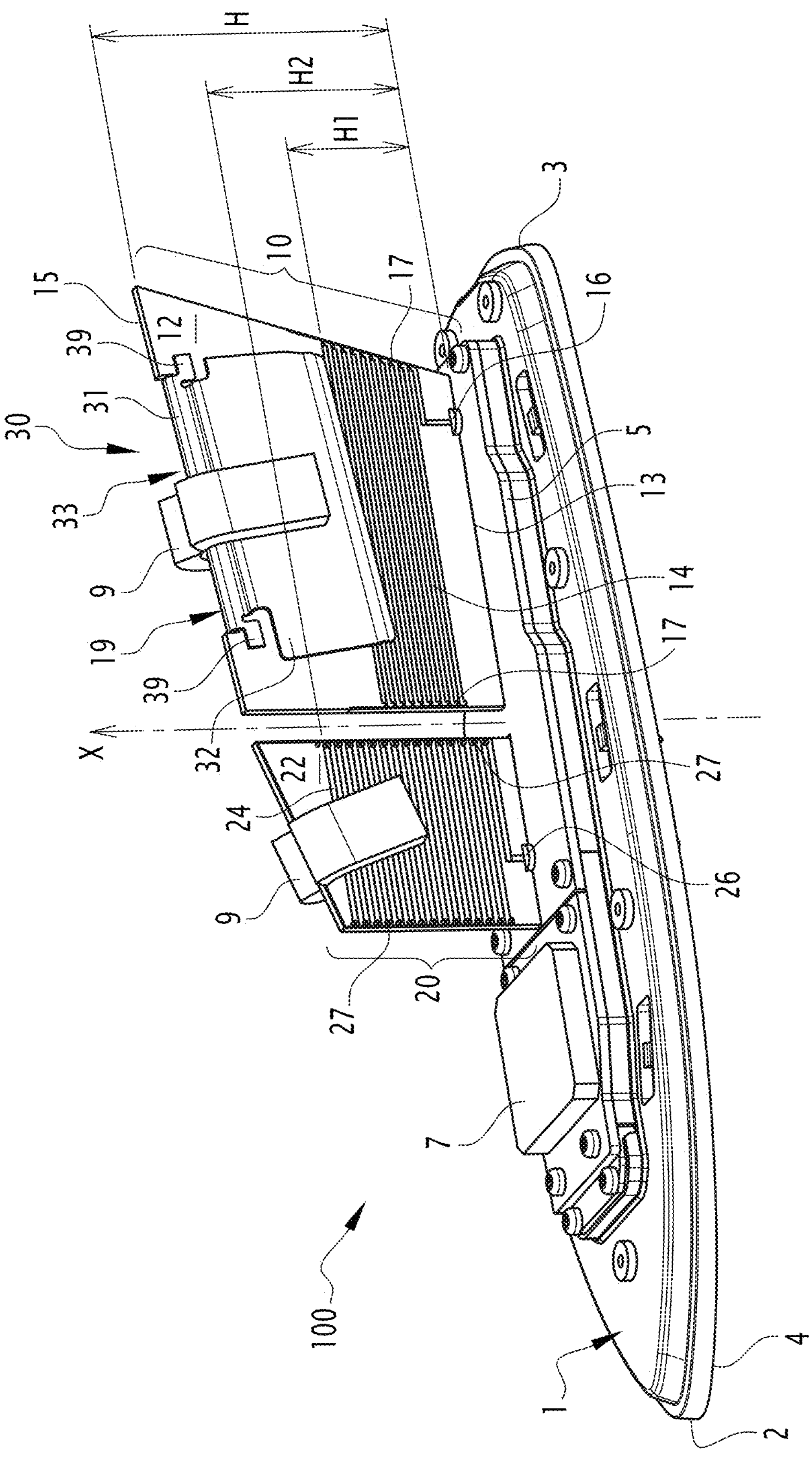
FIG. 2 is a view illustrating another possible embodiment of the antenna according to the disclosure.
Figure 3:
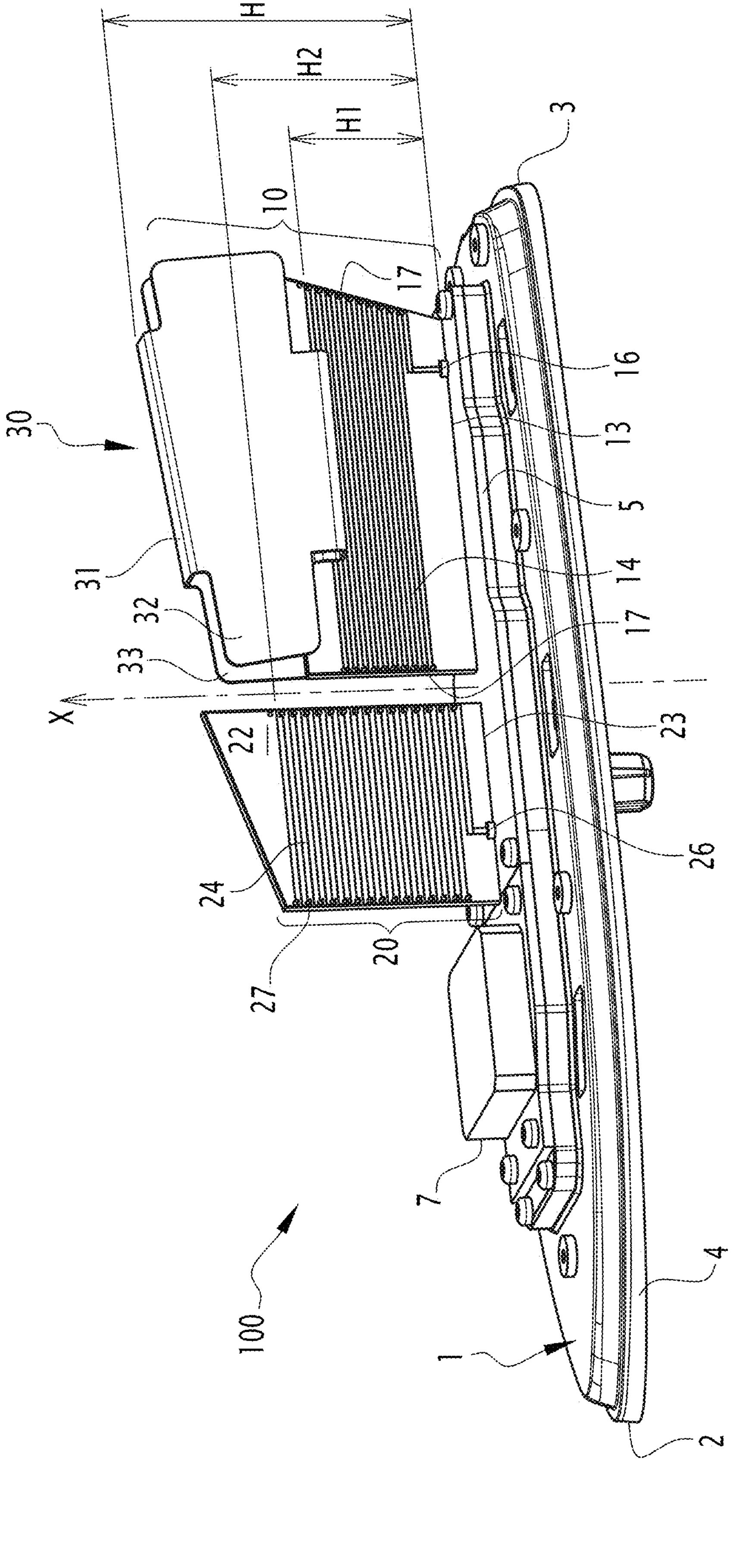
FIG. 3 is a view illustrating a further possible embodiment of the antenna according to the disclosure.

FIGS. 1 to 3 illustrate some possible embodiments of an antenna according to the disclosure, overall indicated by the reference number 100.

The antenna 100 according to the disclosure comprises at least:

a base or mounting plate 1 (hereinafter for simplicity mounting plate) which, in the installation phase of the antenna 100, is suitable to be connected to a mounting surface of a motor vehicle, for example on its roof;

at least a first printed circuit board PCB 5, adapted to be connected, for example in a substantially horizontal position, to the mounting plate 1;

at least a first radiating element, indicated by the overall reference number 10, and a second radiating element, indicated by the overall reference number 20, for transceiving respective first and second signals with devices external to the antenna 100.

In particular, according to a possible embodiment, the first radiating element 10, which is operatively connected to the first printed circuit board 5, is configured to receive/transmit signals of analog type, e.g., in FM (Frequency Modulation) mode.

In accordance with this embodiment, the second radiating element 20, which is also operatively connected to the first printed circuit board 5, is configured to receive/transmit digital-type signals, e.g., according to the DAB (Digital Audio Broadcasting) mode or technique.

The mounting plate 1 is made of metal material, e.g., zamac alloy, and has a front edge 2, a back edge 3, and two side edges 4 which extend from the back edge 3 converging toward each other going to form the front edge 2, having, for example, a pointed shape.

In practice, in such embodiment, the mounting plate 1 has as a whole a shape, seen in plan view from above or below, configured like the base of an iron.

In one possible embodiment, the body of the mounting plate 1, has, for example in a substantially central area, i.e., the area where the first printed circuit board 5 is placed, a compartment or housing space, delimited on the top by the first printed circuit board 5 and along the other sides by contour walls of the mounting plate 1 itself, in which cables, various electronic components, etc., can be housed.

As illustrated in the exemplary embodiment of FIG. 1, the antenna 100 comprises also a cover 40 that is formed by a shaped body internally hollow, made for example of plastic material, and which is mechanically coupled to the mounting plate 1 during assembly so that to house in its cavity at least the first printed circuit board 5, as well as the two radiating elements 10 and 20.

The cover 40 is used also in the embodiments of FIGS. 2 and 3, although therein not illustrated.

Clearly, depending on the applications, other components may be accommodated within the space provided by the cavity of the cover 40, e.g., gaskets, other elements suitable for transceiving signals, etc.; for example, an additional component 7 configured for transceiving GPS signals is illustrated in the embodiments of FIGS. 1 to 3.

The mounting of the mounting plate 1 on the roof or on a suitable mounting surface of a motor vehicle, and the connection of the cover 40 to the same mounting plate 1, are carried out in a manner known or easily implemented by a person skilled in the art, and in any case not relevant to the present disclosure, and therefore not described herein in detail.

Usefully, in the antenna 100 according to the disclosure, the first radiating element 10 comprises a printed circuit board 12, hereinafter referred to as the second printed circuit board 12 for descriptive clarity, which is connected at a first end portion thereof 13, i.e., at a lower end portion thereof, to the first printed circuit board 5 and rises from the first printed circuit board 5 itself along a direction substantially perpendicular to the first printed circuit board 5, e.g., a substantially vertical direction, indicated in FIGS. 1 to 3 by the arrow X.

The second printed circuit board 12 comprises a first track 14 made of an electrically conducting material which has an end portion 16 connected to the first printed circuit board 5 and extends, starting from said end portion 16, on the second printed circuit board 12, along a substantially helical or serpentine path, up to a first height H1.

Such height H1 is measured from the top surface of the first printed circuit board 5 along said direction substantially perpendicular to the first printed circuit board (the substantially vertical direction X).

Figure 4:
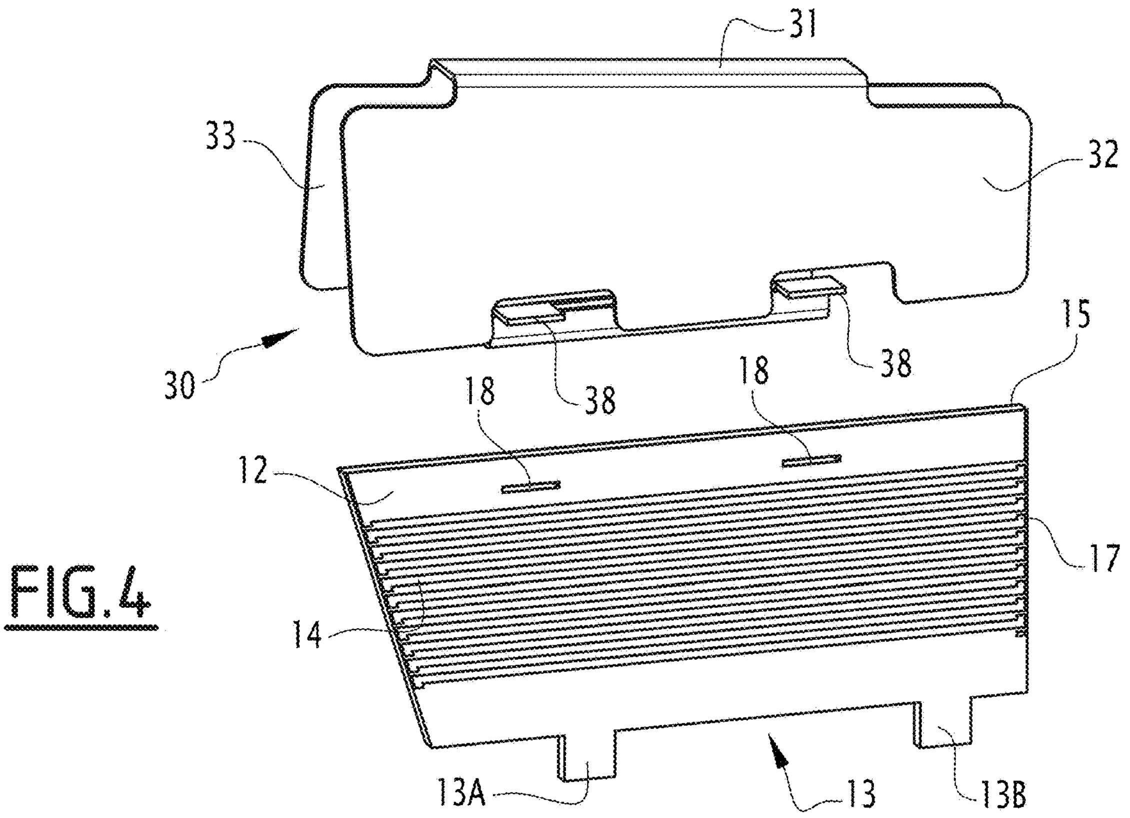
FIG. 4 is a perspective view schematically illustrating the components of a radiating element of the antenna of FIG. 3 under coupling to each other; a further possible embodiment of the antenna according to the disclosure.

For example, the connection between the second circuit board 12 and the first circuit board 5 is realized by means of one or more feet, for example, two 13A and 13B as illustrated in FIG. 4, which are arranged at the lower portion 13 of the second circuit board 12 itself, and are apt to be inserted and soldered there into corresponding slots (not illustrated by figures) arranged on the first circuit board 5.

In turn, the second radiating element 20 comprises a printed circuit board 22, hereafter referred to as the third printed circuit board 22 for descriptive clarity, which is connected at an end portion 23 thereof, i.e., at a lower end thereof, to the first printed circuit board 5 and rises from the first printed circuit board 5 itself along said substantially perpendicular direction to the first printed circuit board 5, e.g., the substantially vertical direction X.

The third printed circuit board 22 comprises a second track 24, realized in an electrically conductive track material, which has an end portion 26 connected to said first printed circuit board 5 and extends, starting from the end portion 26, on the third printed circuit board 22 along a substantially helical or serpentine path, up to a second height H2.

For example, the connection between the third circuit board 22 and the first circuit board 5 is realized in a manner similar to that of the second circuit board 12, e.g., by means of one or more feet, e.g., two, which are arranged at the lower portion 23 of the third circuit board 22 itself, and are adapted to be inserted and soldered into corresponding slots (not illustrated by figures) arranged on the first circuit board 5.

The second height H2 is also measured from the top surface of the first printed circuit board 5 along said direction substantially perpendicular to the first printed circuit board (the substantially vertical direction X).

The tracks 14 and 24 behave substantially as if they were conducting coils wrapped around the respective boards 12 and 22.

In particular, both the conductive tracks 14 and 24 develop along the substantially helical or serpentine path around a substantially vertical axis (i.e. the one indicated by the vertical direction X).

Usefully, in antenna 100 according to the disclosure, the first radiating element 10 has a maximum height H measured from the top surface of the first printed circuit board 5 substantially perpendicular to the first printed circuit board (the substantially vertical direction X), and the first height H1 of the first conducting track 14 is less than or equal to half of said maximum height H of the first radiating element 10.

In this way, signals related to the first radiating element 10 can be decoupled more effectively from those related to the second radiating element 20.

In a possible embodiment, the first height H1 of the first electrically conducting track 14 is lower than the second height H2 of the second electrically conducting track 24.

In this way, the decoupling between the two radiating elements 10 and 20 is further improved.

For example, in one possible embodiment, both conductive tracks 14 and 24 are made by means of strips of electrically conductive material, e.g., copper, which are arranged along two opposite parallel faces (the faces with larger surface area) of the respective printed circuit boards 12 and 22.

A series of suitably metallized through holes, indicated in FIGS. 1 to 3 by the reference numbers 17 for the board 12 and 27 for the board 22, electrically connect to each other the various sections of the conductor strips arranged on the two opposite faces of the respective boards 10 and 20.

In this way, the metalized holes 17 and 27 and the various strips collectively form the electrically conductive tracks 14 and 24 that run continuously along the respective helical or serpentine path up to the corresponding heights H1 and H2.

Conveniently, according to a possible embodiment, the first radiating element 10 and the second radiating element 20, and in particular the respective circuit boards 12 and 22, are arranged in sequence substantially aligned with each other along a direction joining the front edge 2 and the back edge 3 of the mounting plate 1.

In this way, in addition to having an effective decoupling between the signals afferent to the two different radiating elements 10 and 20, there is also an optimal utilization of the available space inside the cap 40.

In one possible embodiment, as for example illustrated in FIGS. 2 and 3, the first radiating element 10 further comprises a capacitive cap 30, made, for example, of a metal material, e.g., tin-plated steel, which is connected to the second printed circuit board 12 at a second end portion 15 of the second board 12 opposite to the first end portion 13.

The capacitive cap 30 cooperates with the conducting strip 14 and allows optimizing the emissive capabilities of the first radiating element 10.

In one possible embodiment, the capacitive cap 30 comprises at least a center section 31, a first arm 32 and a second arm 33 which extend from opposite parts of the center section 31 diverging from each other, and one or more coupling portions which protrude from at least one of said center section 31 and first and second arms 32, 33.

The one or more coupling portions are configured to allow the mechanical connection of the capacitive cap 30 to the second printed circuit board 12, connection that is then typically rendered stable with a weld.

In particular, according to a possible embodiment, the capacitive cap 30 is made of a single piece of metallic material, e.g. suitably folded to form said central section 31, first and second arms 32 and 33, and one or more coupling portions.

Figure 5:
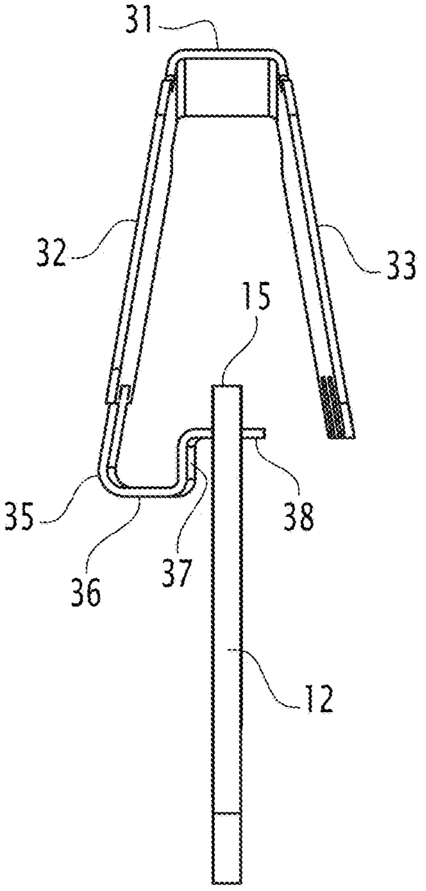
FIG. 5 is a view schematically illustrating the components of the radiating element of FIG. 4 under coupling to each other.

In one possible embodiment, shown for example in FIGS. 4 and 5, the one or more coupling portions comprise a first section 36 which protrudes transversely from one end 35 of the first arm 32 toward the second printed circuit board 12, a second section 37 that protrudes transversely from one end of the first section 36 toward the center section 31, and one or more teeth 38 that protrude transversely from one end of the second section 37.

The one or more teeth 38, in the example of FIG. 2 for instance two, are suitable for insertion, and for example therein soldered, each into a corresponding slot 18 defined on the second printed circuit board 12.

In this way, as, for example, illustrated in FIGS. 3 and 5, the central section 31 is placed above and spaced from the upper portion 15 of the second circuit board 12, with the first and second arms 32 and 33 extending from the middle section 31 from opposite parts of the second circuit board 12 toward the first circuit board 5.

In another possible embodiment, illustrated for example in FIG. 2, the second printed circuit board 12 has, at its upper portion, a recess 19, and in this case the capacitive cap 30 is coupled to the second printed circuit board 12 by positioning, at least partially, the center section 31 within the recess 19 with the first and second arms 32, 33 which extend from the center section 31 along opposite sides of the second printed circuit board 12 toward the first printed circuit board 5.

In this embodiment, the one or more coupling portions comprise one or more protuberances or teeth, schematically indicated in FIG. 2 by the reference number 39, which protrude from the central section 31 and are configured to be mechanically connected, for example soldered, each to the second printed circuit board 12.

In practice, in the various embodiments illustrated, when the capacitive cap 30 is not used, as illustrated, for example, in the embodiment of FIG. 1, the maximum height H of the first radiating element 10 is that achieved by printed circuit board 12.

When instead the capacitive cap 30 is used, the maximum height H of the first radiating element 10 may alternatively be that reached by the printed circuit board 12 if capacitive cap 30 does not have a portion that extends superiorly to the printed circuit board 12, as is the case, for example, in the embodiment shown in FIG. 2, or that reached by the capacitive cap 30 if at least a portion of it protrudes superiorly to the printed circuit board 12, as is the case, for example, in the embodiment shown in FIG. 3.

In addition, at least one protective element 9, formed, for example, by a sponge or a piece of self-adhesive foam, can be placed around the upper portion of the third circuit board 22.

Such a protective element 9 can be placed also directly around the second printed circuit board 12 (see FIG. 1), or around the capacitive cap 30 when used (see FIG. 2).

Clearly, such protective elements 9 can also be used in the embodiment of in FIG. 3.

It has been found in practice that the antenna 100 according to the disclosure adequately fulfills its intended scope since it presents a structure that, compared with known solutions, allows decoupling more effectively the signals afferent to the two radiating elements 10 and 20, exploiting in an optimized way the albeit limited space available within the cover 40.

In addition, the antenna 100 has a structure that makes it suitable for use both in new vehicles and to replace antennas already installed on vehicles in use.

Clearly, without prejudice to the principle of the disclosure, the embodiments and details of implementation may vary widely with respect to what has been described and illustrated purely by way of not limiting examples, without thereby departing from the scope of protection of the present disclosure as defined by the appended claims, including any possible combination, even partial, of the previously described embodiments. For example, the at least one first printed circuit board 5 may comprise two separate boards, and in such a case the first radiating element 10 may be operatively associated with one of the two boards, while the second radiating element 20 may be operatively associated with the other board; the shape and/or positioning of the coupling portions of the capacitive cap may be varied, etc.

The invention claimed is:

1. An antenna for a motor vehicle, comprising:

a mounting plate suitable to be connected to a mounting surface of said motor vehicle;

at least a first printed circuit board adapted to be connected, in a substantially horizontal position, to said mounting plate;

at least one first radiating element for transceiving first signals with the environment outside said antenna, said first radiating element comprising a second printed circuit board which is connected at a first end portion thereof to said first printed circuit board and rises therefrom along a substantially vertical direction, along said second printed circuit board being arranged a first electrically conducting track which has an end portion connected to said first printed circuit board and extends on said second printed circuit board along a substantially helical or serpentine path, up to a first height measured from the top surface of said first printed circuit board along said substantially vertical direction; and at least a second radiating element for transceiving second signals with the environment outside the antenna, said second radiating element comprising a third printed circuit board which is connected at a first end portion thereof to said first printed circuit board and rises therefrom along said substantially vertical direction, along said third printed circuit board being arranged a second electrically conductive track which has an end portion connected to said first printed circuit board and extends on said third printed circuit board along a substantially helical or serpentine path, up to a second height measured from the top surface of said first printed circuit board along said substantially vertical direction;

wherein said first radiating element has a maximum height measured from the top surface of said first printed circuit board along said substantially vertical direction, and said first height of said first electrically conducting track is less than or equal to one-half of said maximum height of said first radiating element;

wherein said first radiating element further comprises a capacitive cap which is connected to said second printed circuit board at a second end portion of said second printed circuit board opposite said first end portion;

wherein said capacitive cap comprises at least a center section, a first arm and a second arm which extend from opposite parts of the center section diverging from each other, and one or more coupling portions which extend from at least one of said center section and first and second arms and are configured to allow mechanical connection of the capacitive cap to the second printed circuit board; and wherein said one or more coupling portions comprise a first section protruding transversely from one end of said first arm toward said second printed circuit board, a second section that protrudes transversely from one end of the first section toward the center section, and one or more teeth that protrude transversely from one end of the second section and are each suitable for insertion into a corresponding slot defined on the second printed circuit board.

2. The antenna according to claim 1, wherein said first height of the first electrically conducting track is less than the second height of the second electrically conducting track.

3. The antenna according to claim 1, wherein with reference to a side view, said mounting plate has a front edge and a rear edge, and wherein said first radiating element and said second radiating element are arranged in sequence substantially aligned with each other along a direction joining said front and rear edges.

4. The antenna according to claim 1, wherein said capacitive cap is made of a single piece of metallic material.

5. The antenna according to claim 1, wherein said second printed circuit board has, at its upper portion, a recess, and wherein said capacitive cap is coupled to the second printed circuit board by positioning, at least partially, the center section within the recess with the first and second arms extending from the center section along opposite sides of the second printed circuit board toward the first printed circuit board.

6. The antenna according to claim 5, wherein said one or more coupling portions comprise one or more teeth extending from the central section and are configured to be mechanically connected each to the second printed circuit board.

7. A motor vehicle comprising at least one antenna according to claim 1.

* * * * *